Oct. 12, 1954     H. L. BARNEBEY     2,691,460
GASKET SEALING AND COOLING SYSTEM
Filed Sept. 27, 1950     3 Sheets-Sheet 1

INVENTOR
HERBERT L. BARNEBEY
by Hooper, Leonard & Glenn
his attorneys.

Oct. 12, 1954

H. L. BARNEBEY 2,691,460

GASKET SEALING AND COOLING SYSTEM

Filed Sept. 27, 1950

INVENTOR
HERBERT L. BARNEBEY
by Hooper, Leonard & Glenn
his attorneys.

Oct. 12, 1954  H. L. BARNEBEY  2,691,460
GASKET SEALING AND COOLING SYSTEM
Filed Sept. 27, 1950  3 Sheets-Sheet 3
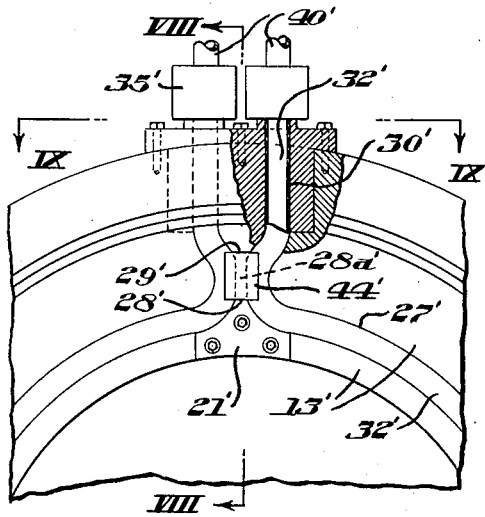
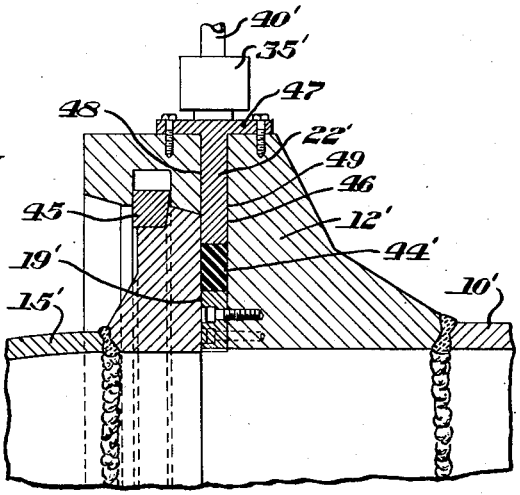
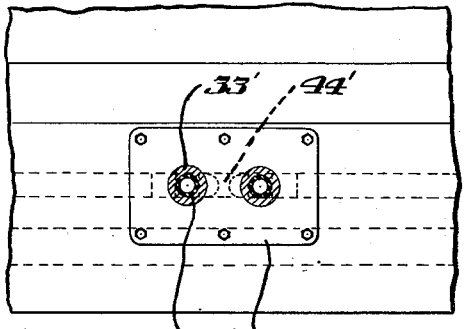
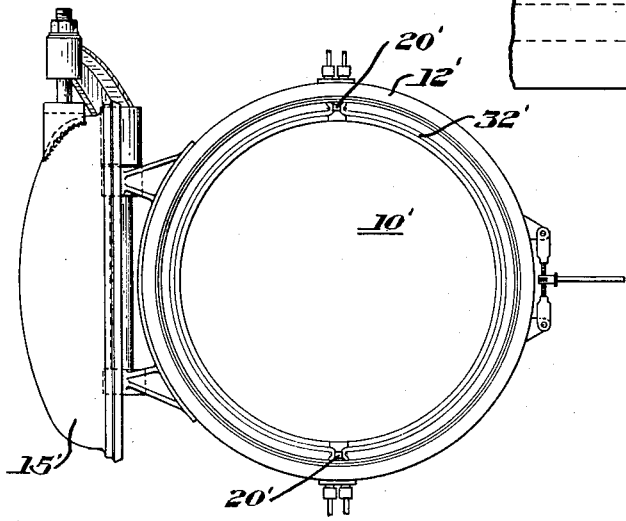
INVENTOR
HERBERT L. BARNEBEY
by Hoopes, Leonard & Glenn
his attorneys Patented Oct. 12, 1954

2,691,460

UNITED STATES PATENT OFFICE 2,691,460

GASKET SEALING AND COOLING SYSTEM

Herbert L. Barnebey, Richland Township, Allegheny County, Pa., assignor, by mesne assignments, to Blaw-Knox Company, Pittsburgh, Pa., a corporation of Delaware Application September 27, 1950, Serial No. 187,112

12 Claims. (Cl. 220—46)

This invention relates to a gasket sealing system in which the gasket is inflatable to seal a joint between opposed surfaces surrounding a pressure or vacuum zone. More particularly, this invention relates to such a gasket sealing system in which a fluid such as water is used both to inflate the gasket and to keep it cool under the conditions of operation while at the same time maintaining the complete integrity of the seal surrounding the pressure or vacuum zone.

In the art dealing with the problem of sealed closures for pressure vessels in which said closures have repeatedly to be opened to open the vessel, some leakage around the joint between the closure and the vessel has been regarded as an unavoidable evil. This is particularly the case with pressure vessels having quick-opening doors. Despite many attempts to solve the leakage problem and to make the sealing gasket stand up under the conditions of temperature and pressure that might be encountered, the problem has remained. In cases of high pressure vessels or vessels of large opening, there is a tendency for the gasket material to blow out. Further, when the gasket material is of a resilient nature, increased temperature materially contributes, as in the case of rubber gaskets, to the rapid deterioration of the sealing material. Since the very purpose of pressure vessels with quick-opening doors is to increase the length of time in operation of the vessel, the destruction or accelerated deterioration of the seals requires frequent replacement with consequent increase in uneconomic down-time.

In the gasket sealing and cooling system of this invention, a novel device is provided which at one and the same time effects complete sealing around the entire joint of the pressure or vacuum vessel without leakage, and maintains the gasket cool so that it is not subject to the accelerated deterioration brought about by any operation of the vessel at higher temperatures. Provision may also be made to insure against any blow-out. Other objects and advantages of this invention will be apparent from the following description and from the drawings, which are illustrative only, in which, Figure 1 is a plan view of the underside of a door or closure provided with one embodiment of this invention and intended for a pressure vessel;

Figure 6 is a view in elevation of a quick-opening door type of pressure vessel to which a form of the system of this invention has been applied;

Figure 7 is an enlarged view in elevation and partly in section of the terminal zone and adjacent area of the system applied to the top of the pressure vessel shown in Figure 6;

Figure 8 is a view in section taken along line VIII—VIII of Figure 7; and

Figure 9 is a top view partly in section of the terminal plate structure shown in Figure 8.

Figure 2:
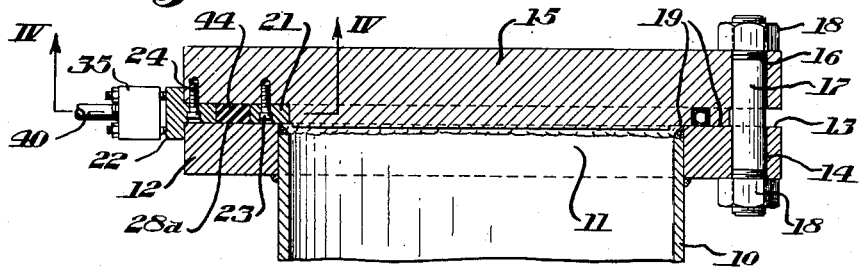
Figure 2 is a sectional view of the closure shown in Figure 1 taken along line II—II of Figure 1 after the closure has been assembled in sealed relation with its pressure vessel.
Figure 1:
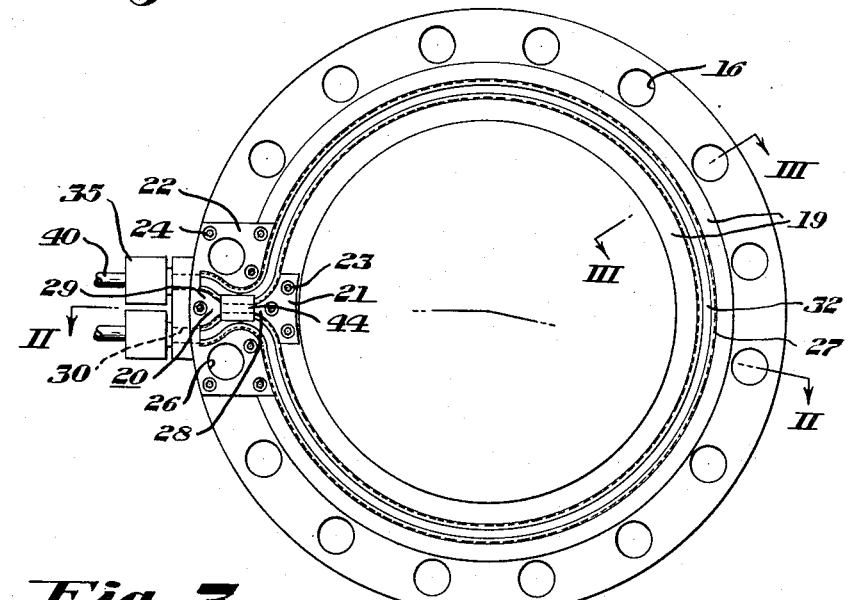

Referring to the embodiment of this invention shown in Figures 1 to 5, a pressure vessel 10 is provided with an opening 11 around which a bearing flange 12 is welded. Flange 12 is provided with an annular or discoidal surface 13 and is drilled to provide a series of circumferentially placed and axially extending stud-bolt openings 14.

Pressure vessel 10 is closed by a door or closure 15 to which one embodiment of the system of this invention is applied. Closure 15 is circumferentially drilled to provide a series of axially extending stud-bolt openings 16 adapted to register with the corresponding openings 14 in flange 12. Thereby, stud bolts 17 with their accompanying nuts 18 may be used to pass through each opening 16 in registry with an opening 14 to fasten closure 15 to pressure vessel 10. A dropped discoidal or annular surface 19 engages surface 13 in proximate opposed relation thereto to form a joint substantially entirely around pressure zone opening 11. In the terminal zone 20 of closure 15 the surface 19 is completed by a guiding insert 21 and a terminal plate 22, the bottoms of which lie in the same plane as the surface 19 of which they may be considered a part in completing the joint between closure 15 and flange 12. Thus, the inner portion of surface 19 with the bottom of insert 21 forms a complete, continuous and unbroken opposed surface relative to surface 13. Insert 21 is fastened to the underside of closure 15 by machine bolts 23 having slotted or recessed heads for engagement with a bolt driver. The bolts 23 are countersunk relative the bottom surface of insert 21 so as not to project beyond that surface, as shown in Figure 2. Terminal plate 22 is similarly affixed to the underside of closure 15 by the machine bolts 24. In addition, terminal plate 22 is drilled to provide openings 26 for stud bolts 17 arranged in equidistant relation around the flange 12 and the edge of closure 15 when the closure is in closed position relative to pressure vessel 10.

The outer portion of surface 19 is separated from the inner portion thereof by a guiding recess or groove 27 located within the joint area defined by the opposed surfaces 19 and 13 when they are substantially in contact making the joint for the vessel 10. The two ends respectively of guiding recess 27 merge in terminal zone 20 between the radially outwardly extending nose 28 of guiding insert 21 and the radial inwardly extending projection 29 of terminal plate 22. In that merger space 28a the two ends of guiding recess 27 bend outwardly and extend in a substantially parallel direction toward the outside of the joint. These ends of recess 27 again separate on the opposite sides of projection 29 and are continued within plate 22 by the parallel drilled passages 30 extending beyond the joint between surfaces 19 and 13. The recesses 31 in terminal plate 22 constitute end portions of guiding recess 27 as will be seen from Figure 4.

Figure 3:
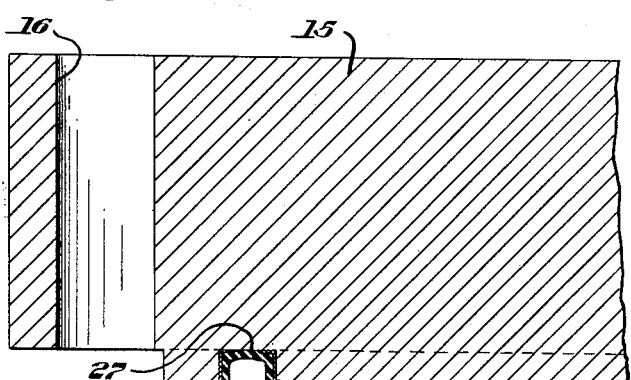
Figure 3 is a sectional view through the aforesaid closure taken along line III—III of Figure 1.
Figure 4:
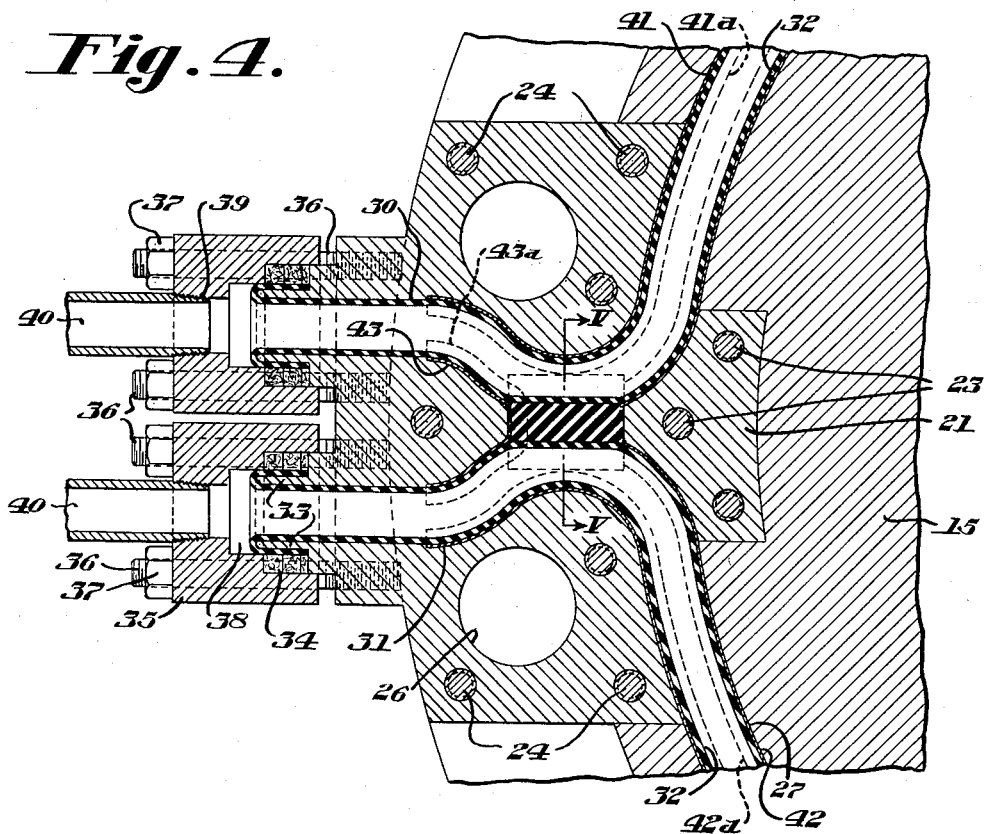
Figure 4 is an enlarged view taken along line IV—IV of Figure 2.

A resilient tubular gasket 32 of any suitable rubber-like material, such as neoprene, is positioned in guiding recess 27 from one end to the other thereof. Preferably, gasket 32 may be made seamless and jointless between the respective ends thereof. In the positioning of gasket 32 normally no adhesive is necessary or used to hold it to the top wall of the recess as viewed in Figure 3. The respective ends of gasket 32 pass through the respective passages 30 in terminal plate 22 and are turned back as shown in Figure 4 over the annular bosses 33. Compressible packing 34 closely surrounds the turned-back ends of elastic gasket 32. Individual drilled caps 35 are fastened around each boss 33 by studs 36 and nuts 37. The inwardly stepped axial recess 38 of each cap 35 acts to compress the packing 34 and to clear the exterior cylindrical periphery of boss 33 by slightly less than the thickness of gasket 32. By so doing, tightening up the nuts 37 to move the caps 35 toward terminal plate 22 compresses the packing 34 and seals the bases of the caps tightly to the terminal plate 22 around the open end of each gasket tube 32. At the same time, as and when it becomes necessary to replace gasket 32, the caps 35 can quickly be removed allowing the respective ends of the gasket to be quickly freed when the packing 34 is taken off. Each recess 38 is continued through cap 35 by an axially drilled and tapped opening 39 into which a fluid pipe 40 is screwed.

Inasmuch as closure 15 is usually the movable member relative to pressure vessel 10, the outer ends of the pipes 40 will usually be respectively connected to a fluid pressure source such as a pump (not shown) and, for example, to a throttle valve or the equivalent, each time the cover is bolted in place. In this way, the end of gasket 32 connected to the pump would be the inlet end and the other end of gasket 32 connected, for example, to the throttle valve would be the outlet end of the sealing and cooling assembly of this invention. Alternatively, the pipe connections may be permanent through high-pressure flexible conduits, if desired.

At high pressures there is a tendency for resilient gaskets to "blow out" when sealing pressure vessel joints. A solution to this problem is shown in United States patent application Serial No. 725,135, filed January 29, 1947, for "Sealed Closure for High-Pressure Vessel," and now abandoned, in which the use of a metal channel sheathing member having deformable flanges is disclosed. In the embodiment of this invention illustrated in Figures 1 to 5, metal channels of such character may be utilized. Thus, as shown in Figure 3, a metal channel 41 is provided around the entire low-pressure side of guiding recess 27 in sheathing contact with gasket 32. Similarly, a metal channel 42 is provided around the entire high pressure side of guiding recess 27 including the high-pressure faces of nose 28 of insert 21. In addition, a similar channel section 43 extends without interruption around the faces of projection 29 of plate 22. These last-mentioned faces of projection 29 form the adjacent sides of the respective ends of guiding recess 27 outwardly of the merger space 28a. Each of these metal channels 41, 42 and 43 is provided with deformable flanges respectively numbered 41a, 42a and 43a and serve by providing a narrower gap between flanges 41a and 42a and between flanges 41a and 43a to avoid any tendency of gasket 32 to extrude or blow out when fluid under sealing pressure is circulated through the interior of gasket 32. During such circulation, the respective deformable flanges flare outwardly and tend to align themselves with the web of the respective metal channel until halted usually in the case of the lower flanges shown in Figure 3 by contact with opposed surface 13. The double provision of members 41 and 42 permits the seal to be subjected to hydraulic pressure applied in the gasket when the door is closed, before the contents of the vessel come up to pressure. As the pressure in the vessel usually builds up gradually, starting from atmospheric pressure, it is advantageous to prepare the seal to hold full pressure in advance. Two sheaths may also be of advantage where the vessel is subject to vacuum, though at low pressure differentials of which one atmosphere may be representative, the gasket itself may be sufficient and no metal channels at all may be required, particularly when the opposed surfaces forming the vessel joint are of a finished character adapted to contact each other when the vessel is closed.

The use of a gasket such as gasket 32 in the system of this invention has a number of advantages over prior arrangements such as those which used an endless resilient ring which might be represented, for example, by the inner tube for a tire. This prior device has the objection that it required precise manufacture in a wide range of sizes for different shapes and lengths of joints to be sealed. Further, it was susceptible to leakage which, if it occurred, destroyed or impaired the seal and, still further, such endless gaskets might not be particularly adaptable to changes brought about by fluctuations within the range of temperatures to which they were subjected. A modification of the endless type of gasket in the prior art had a similar single inlet and a blanked-off end which was overlapped with another portion of the length of the gasket to attempt to form a complete unbroken joint. The leakage problem in this type of gasket was even more severe than in the truly endless form.

Whenever the prior practice attempted to use in the field of pressure vessels and the like lengths of gaskets having two ends which had to be brought outside the joint, a severe leakage problem persisted in the space between the two ends where they were led away from the joint. It was in this area that the continuity and unbroken character required of a sealed joint in pressure vessels was most subject to impairment or failure.

Figure 5:
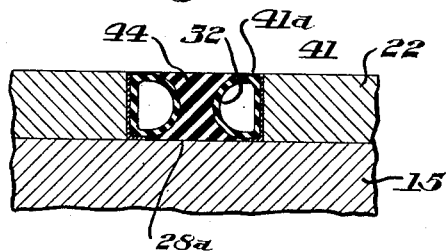
Figure 5 is a view in section taken along line V—V of Figure 4 in the terminal zone of the aforesaid closure embodying one form of the new system of this invention.

As described above herein, in the system of this invention a tubular gasket 32 is provided having two ends which can be led out beyond the joint between the opposed surfaces 13 and 19. Then by pumping or circulating a fluid, such as an oil or water, from the inlet end to the outlet end of gasket 32 through the interior thereof, gasket 32 can be inflated, sealing the joint from one edge of the terminal zone 20 to the other edge of terminal zone 20 as shown by the right-hand side of Figure 2. Within terminal zone 20, a double concave compressible member 44 in the form of a saddle or yoke made of rubber or equivalent flexible material is provided. This saddle 44 fits in the merger space 28a as shown in Figure 5 and is in direct contact with the opposed sides of gasket 32 along the portion of the respective ends thereof passing through the merger junction between nose 28 and projection 29. Because of the resilient character of gasket 32 it conforms in the guiding recess 27 to the shape thereof as shown in Figure 3 and also to the shape of the saddle 44 as shown in Figure 5. Then, when gasket 32 is inflated, sealing is effected in the terminal zone 20 between the substantially parallel ends of gasket 32 by the transverse deformation of the flexible saddle 44 increasing its vertical dimension as shown on the left-hand side of Figure 2 and causing it to press against opposed surface 13 and the adjoining surfaces of closure 15 and terminal plate 22 to complete a continuous and unbroken, fully sealed joint between closure 15 and pressure vessel 10. Moreover, the same unbroken and continuous sealing may be effected by means of the system of this invention irrespective of the length of the joint between the vessel 10 and the closure 15, and irrespective of whether or not that joint in plan is generally circular, oval, polygonal, or rectangular. The pressure transmitted through saddle 44 during the inflation of gasket 32 normal to the opposed surfaces of the joint also, as may be realized from looking at Figure 4, flares the center portion of the metal channel 43 to assist in the manner previously described. The deformable of flanges of these respective channels 41, 42 and 43 are usually made with some resilience so that there is at least a partial restoration toward their original positions whenever the inflation of gasket 32 is reduced.

The provision of a constant circulation of fluid through a gasket, such as gasket 32, in the system of this invention, not only maintains the sealing pressure within the gasket at fully effective sealing force throughout the entire operation but it has in addition an important cooling function. The temperature conditions which may be attained in the field of pressure vessels and the like are deleterious to many rubber-like or resilient substances otherwise satisfactory for use as sealing gaskets. In this invention, the fluid, for example water, is normally circulated through the interior of a gasket, such as gasket 32, at a temperature below the deterioration temperature of the gasket material. In this way, the gasket is maintained cool during operation and thereby effectively preserves its original strength and characteristics over a longer period. In turn, gasket replacement is needed less often to a marked extent and the efficiency of the entire operation improves as a consequence.

Further, the provision of a gasket having two ends makes it easier to insure the maintenance of adequate sealing pressure therein during the sealing period. Thus, the inflating fluid makes a full circuit around the gasket which insures that the gasket is filled throughout. The pressure source will usually be provided with sufficient capacity to prevent a harmful drop in the fluid pressure. The provision of a throttle valve, for example, on the outlet end of the fluid circulating passages beyond the joint in the system of this invention aids in maintaining the fluid at adequate sealing pressure without excessive circulation and at the same time permits enough circulation for the cooling required.

In Figures 6 to 9 there is illustrated a quick-opening door type of pressure vessel embodying a form of the system of this invention. This embodiment is in general purpose and construction similar to the embodiment disclosed in Figures 1 to 5 hereof and corresponding parts of the structure bear the same reference numerals with the addition of a prime thereto. Thus, in Figures 6 through 9, the system is mounted in the door frame 12' of a pressure vessel 10' having a quick-opening type of door 15' which is locked by means of a locking ring 45. Quick-opening door 15' which is locked by means of a locking ring 45. Quick-opening door 15' and the means for locking it including locking ring 45 are more fully set forth in United States patent application Serial No. 33,420 filed June 16, 1948, for "Quick Opening Closures," and now abandoned, although the system of the present invention is equally applicable to other quick-opening types of pressure or vacuum vessel doors.

Moreover, inasmuch as some pressure vessels may be made of large diameter, it may on occasion be desirable to have the system of this invention completed around the 360° of the joint by the use of a plurality of end-to-end portions forming a complete gasket 32' and a plurality of terminal zones 20' as shown in Figure 6. Such an arrangement not only correspondingly reduces the length of the tube in each arc or portion of the gasket 32' but also increases the volume of cooling liquid which may be circulated through the respective gasket portions. Further, the pressure drop of the cooling liquid between the inlet and outlet end of each gasket portion is reduced giving closer equalization of pressure between such ends of each such portion.

Although the embodiment in Figures 6 to 9 incluisve is shown with the complete gasket 32' made up of two 180° portions, the system of this invention may equally be well applied to a larger number of gasket portions each of which seals a corresponding arcuate length between the endless opposed joint surfaces. Where there are a plurality of portions making up a complete 360° gasket, the liquid through the gasket portions may also be circulated in series flow, if desired, with coolers inserted in the circuit between the outlet of one portion and the inlet of the next succeeding portion.

The terminal zones and associated parts at the bottom and top of door frame 12', as shown in Figure 6, are identical. Thus, a terminal plate 22' is inserted into frame 12' through a broached opening 46. A flange 47 surrounds plate 22' at the top thereof and is bolted to the exterior periphery of frame 12'. Annular surface 19' of closure 15' forms a joint with a continuous annular surface 13' of frame or flange 12'. An annular groove or guiding recess 27' is formed in surface 13' for the gasket portions 32'. The inner portion of surface is completed by guiding inserts 21' at the top and bottom of frame 12' the outwardly leading ends of the respective 180° recess 27' portions. It will thus be seen that the opposed surfaces 19' and 13' substantially form an unbroken joint similar to that formed by surfaces 19 and 13 except that the system of this invention modified as described is now applied to the immovable opposed surface 13' of the joint in the embodiment of Figures 6 through 9 rather than to the movable opposed surface 19' as in the case of the embodiment shown in Figures 1 to 5.

In Figures 6 through 9 metal channels are not shown; however, it is understood that they may be included if desired. Beyond the merger space 28a' terminal plate 22' has the passages 30' extending entirely through from the front face 48 in the same plane as surface 13' to the rear face 49 in the same plane as the rearmost wall of groove 27'. Annular bosses 33' do, however, form a complete closed passage for the respective ends of the gasket portions 32' and act in the same manner as bosses 33 in the earlier described embodiment. In all other respects, the structure and functioning of the two embodiments correspond.

Various modifications may be made in the system of this invention without departing from the scope thereof as defined in the appended claims.

I claim:

1. In a gasket sealing system, in combination, opposed continuous surfaces forming a continuous unbroken joint adapted to be sealed when said surfaces are in proximate relation, a flexible tubular gasket positioned between said opposed surfaces, said gasket having at least one inlet and one outlet projecting beyond said joint in proximate relation to each other, and a compressible member outside said gasket positioned between said opposed surfaces and the two ends of said gasket adjacent said inlet and outlet, whereby a fluid is adapted to be passed through said gasket from said inlet to said outlet to inflate it, deform said member and seal said joint.

2. In a gasket sealing and cooling system, in combination, continuous curved surfaces in opposed relationship adapted to form a continuous unbroken joint when in proximate relation to each other, a resilient tubular gasket engaging one of said surfaces and extending around the entire joint, at least one terminal zone in said joint through which an inlet end and an outlet end of said gasket pass, and a compressible member outside said gasket attached to said last-mentioned surface and positioned between and in contact with said inlet end and said outlet end of said gasket, whereby a fluid is adapted to be circulated through said gasket to inflate it to seal said joint and cool said gasket.

3. In a gasket sealing system, in combination, continuous opposed surfaces adapted to form a continuous unbroken joint when said surfaces are in proximate relation, a resilient tubular gasket attached to one of said surfaces and extending along the entire length of said joint, said gasket having an inlet end and an outlet end adjacent to each other within a terminal zone in said joint, a compressible member outside said gasket attached to said last-mentioned surface and positioned in said zone between said inlet end and said outlet end of said gasket, said compressible member conforming in configuration to the configuration of the exterior of said inlet end and said outlet throughout the area in which they are adjoining respectively, and means to inflate said gasket and compress said compressible member to seal said joint.

4. In a gasket sealing and cooling system, in combination, continuous surfaces in opposed relation adapted to form a continuous unbroken joint when in proximate relation to each other, a resilient tubular gasket attached to one of said surfaces and extending around the entire joint, a terminal plate attached to said last-mentioned surface and adapted to receive the ends of said tubular gasket, means for fastening said ends to said terminal plate, and a compressible member outside said gasket attached to said last-mentioned surface inwardly of said terminal plate, said compressible member being in contact with the respective end portions of said gasket adjacent said terminal plate, whereby a fluid is adapted to be passed through said gasket to inflate it to seal said joint and cool said gasket.

5. In a gasket sealing system, in combination, unbroken surfaces in opposed relationship surrounding a pressure zone and adapted to form a continuous unbroken joint when in proximate relation to each other, a resilient tubular gasket engaging one of said surfaces and extending around said pressure zone, said gasket having at least two substantially parallel proximate ends leading off from said joint, a compressible member outside said gasket positioned between and in contact with said substantially parallel ends, and means for passing a fluid through said gasket to inflate it against said surfaces and compress said compressible member to seal said joint.

6. In a gasket sealing system for a quick opening pressure vessel door or the like having opposed surfaces adapted to form a continuous unbroken joint when in proximate relation to each other, in combination, a guiding recess in one of said surfaces extending substantially around the entire joint, said guiding recess having its ends leading away from said joint toward the low pressure side, a recessed terminal plate attached adjacent said last-mentioned surface with the recesses of said terminal plate in registry with the ends of said guiding recess, a resilient tubular gasket positioned in said guiding recess and having its ends positioned in the ends of said guiding recess and extending into the respective recesses in said terminal plate, said ends of said gasket being fastened to said terminal plate, and a compressible member of double concave cross section in contact with the outside of the respective ends of said gasket, whereby when a cooling liquid is circulated through the respective recesses in said terminal plate, said gasket is cooled, inflates and compresses said compressible member to seal said joint against the other of said surfaces.

7. In a gasket sealing and cooling system for a quick-opening pressure vessel door or the like having opposed surfaces adapted to form a continuous unbroken joint when in proximate relation to each other, in combination, a guiding recess in one of said surfaces extending substantially around the entire joint, said guiding recess having its ends merging and leading away in a substantially parallel direction toward the low pressure side of said joint, a resilient tubular gasket positioned in said guiding recess with the ends thereof positioned in the ends of said guiding recess, and a compressible member of double concave cross section in direct contact with the outside of the respective ends of said gasket within the merged portion of said ends of said guiding recess, said ends of said gasket extending beyond said merged portion of said guiding recess away from said joint, whereby when a cooling liquid is circulated through said gasket, said gasket is cooled, inflates and compresses said compressible member to seal said joint against the other of said surfaces.

8. In a gasket sealing system, in combination, opposed unbroken surfaces surrounding a pressure zone and adapted to form a continuous unbroken joint when in proximate relation to each other, a resilient tubular gasket positioned against one of said surfaces, said gasket having two ends leading off from said joint, a compressible member outside said gasket positioned between and in contact with said ends, at least one channel in contact with the low pressure side of said gasket substantially entirely around said joint, said channel having deformable flanges and its web generally normal to said surfaces, and means for passing a fluid through said gasket to inflate it and extend said flanges to seal said joint.

9. In a gasket sealing and cooling system, in combination, opposed unbroken surfaces surrounding a pressure zone and adapted to form a continuous unbroken joint when in proximate relation to each other, a resilient tubular gasket positioned against one of said surfaces substantially entirely surrounding said pressure zone, said gasket having two ends in proximate and substantially parallel relation leading off from said joint in a terminal zone, a compressible member positioned between and in contact with said ends, said compressible member being positioned against said one of said surfaces, a channel having deformable flanges positioned against the low pressure side of said gasket substantially entirely around said joint, and a terminal plate fastened to said one of said surfaces to receive said ends of said gasket, means for fastening said ends of said gasket to said terminal plate, whereby a cooling liquid is adapted to be circulated through said gasket to inflate it, deform said deformable flanges and compress said compressible member to seal said joint while maintaining said gasket cool.

10. In a gasket sealing and cooling system for a quick-opening pressure vessel door or the like having opposed surfaces adapted to form a continuous unbroken joint when in proximate relation to each other, in combination, a guiding recess in one of said surfaces extending substantially around the entire joint, said guiding recess having its two ends merging and leading away in a substantially parallel direction toward the low pressure side of said joint, a resilient tubular gasket positioned in said guiding recess with the ends thereof positioned in the ends of said guiding recess, a channel lining each side of said recess in contact with the respective sides of said gasket, said channel having deformable flanges, and a compressible member of double concave cross section in direct contact with the outside of the respective ends of said gasket within the merged portion of said ends of said guiding recess, said ends of said gasket extending beyond said merged portion of said guiding recess away from said joint, whereby when a cooling liquid is circulated through said gasket said gasket is cooled, inflates, expands said deformable flanges and compresses said compressible member to seal said joint against the other of said surfaces.

11. In a gasket sealing and cooling system, in combination, unbroken surfaces in opposed relationship surrounding a pressure zone and adapted to form a continuous unbroken joint when in proximate relation to each other, a guiding recess in one of said surfaces, a terminal plate having recesses in registry with the ends of said guiding recess, a resilient tubular gasket positioned in said guiding recess and having its respective ends positioned in the recesses in said terminal plate, said respective ends being connected only through substantially the entire length of said gasket, a compressible member between said respective ends in contact with exteriors of both thereof, and means connected to said respective ends for passing a liquid through said gasket to inflate it against the sides of said respective recesses and the other of said surfaces to seal said joint and cool said gasket.

12. In a gasket sealing system, in combination, opposed continuous surfaces forming a continuous unbroken joint adapted to be sealed when said surfaces are in proximate relation, an expansible tubular gasket positioned between said opposed surfaces, said gasket having ends connected only through substantially the entire length of said gasket, a compressible member between said respective ends in contact with exteriors of both thereof, and means connected to said ends for passing liquid through said gasket to inflate to seal said joint.

References Cited in the file of this patent

UNITED STATES PATENTS

| Number | Name | Date |
|---|---|---|
| 647,379 | Davis | Apr. 10, 1900 |
| 672,475 | Cavallaro | Apr. 23, 1901 |
| 1,439,452 | Shaw | Dec. 19, 1922 |
| 1,633,121 | Minton | June 21, 1927 |
| 1,678,946 | Joyce | July 31, 1928 |
| 1,826,941 | La Mont | Oct. 13, 1931 |
| 2,152,489 | Lamb | Mar. 28, 1939 |
| 2,306,160 | Freyssinet | Dec. 22, 1942 |
| 2,362,935 | Schlobohm et al. | Nov. 14, 1944 |